United States Patent [19]

Nihei et al.

[11] Patent Number: 5,639,204

[45] Date of Patent: Jun. 17, 1997

[54] POSITIONING DEVICE FOR AN INDUSTRIAL ROBOT

[75] Inventors: Ryo Nihei; Akihiro Terada, both of Fujiyoshida; Kyozi Iwasaki, Hachiogi; Hikaru Yamashiro, Minamitsuru-gun, all of Japan

[73] Assignee: Fanuc, Ltd., Yamanishi, Japan

[21] Appl. No.: 362,499

[22] PCT Filed: May 12, 1994

[86] PCT No.: PCT/JP93/00769

§ 371 Date: Jan. 11, 1995

§ 102(e) Date: Jan. 11, 1995

[87] PCT Pub. No.: WO94/26475

PCT Pub. Date: Nov. 24, 1994

[30] Foreign Application Priority Data

May 13, 1993 [JP] Japan .................. 5-111577

[51] Int. Cl.⁶ .................................................. B25J 9/06
[52] U.S. Cl. .................................. 414/680; 901/50
[58] Field of Search .................. 414/680, 730, 414/735; 901/50

[56] References Cited

U.S. PATENT DOCUMENTS 4,552,502 11/1985 Harjar ............................... 901/50 X
4,892,457 1/1990 Bartlett et al. ..................... 961/50 X

FOREIGN PATENT DOCUMENTS 62-297082 12/1987 Japan .
1-143376 10/1989 Japan .
2-83183 3/1990 Japan .

Primary Examiner—Donald W. Underwood
Attorney, Agent, or Firm—Nikaido Marmelstein Murray & Oram LLP

[57] ABSTRACT

A positioning device for positioning a robot unit (30) of a multi-articulated type industrial robot at an origin reference position having a polygonal male jig (52) attached to an extremity of the robot unit (30), and a polygonal female jig (58) suitable for being mated with the polygonal male jig (52), and the flat surfaces of the polygonal male jig (52) are brought into contact with the flat surfaces of the polygonal female jig (58) to position the robot unit (30) at the origin reference position. When mating the male jig (52) and the female jig (58) with each other in close surface-to-surface contact, the male jig (52) is pressed by pressing means (64) to bring the predetermined flat surfaces of the polygonal male jig (52) into close contact with the predetermined flat surfaces of the female jig (58).

3 Claims, 5 Drawing Sheets

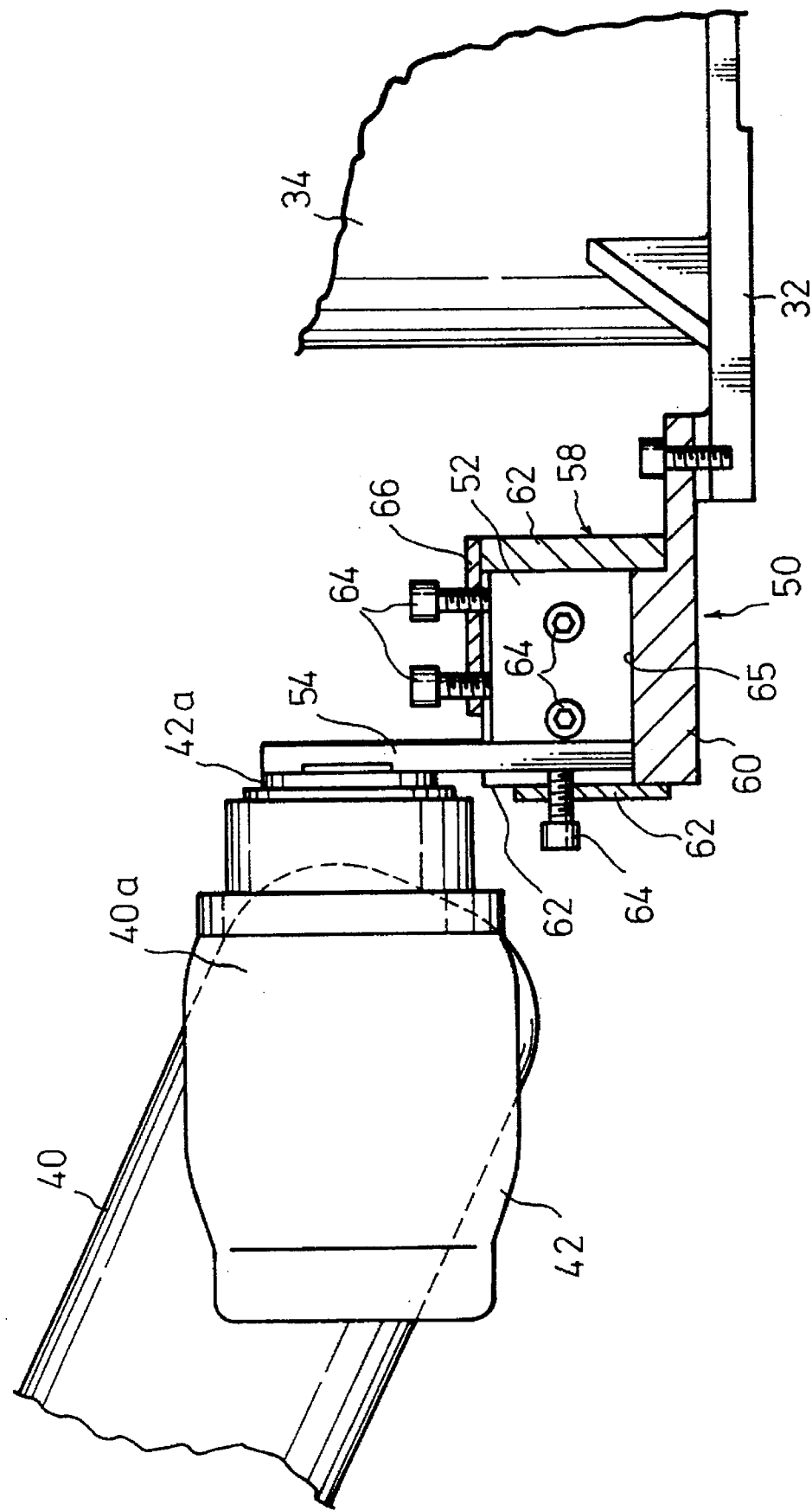

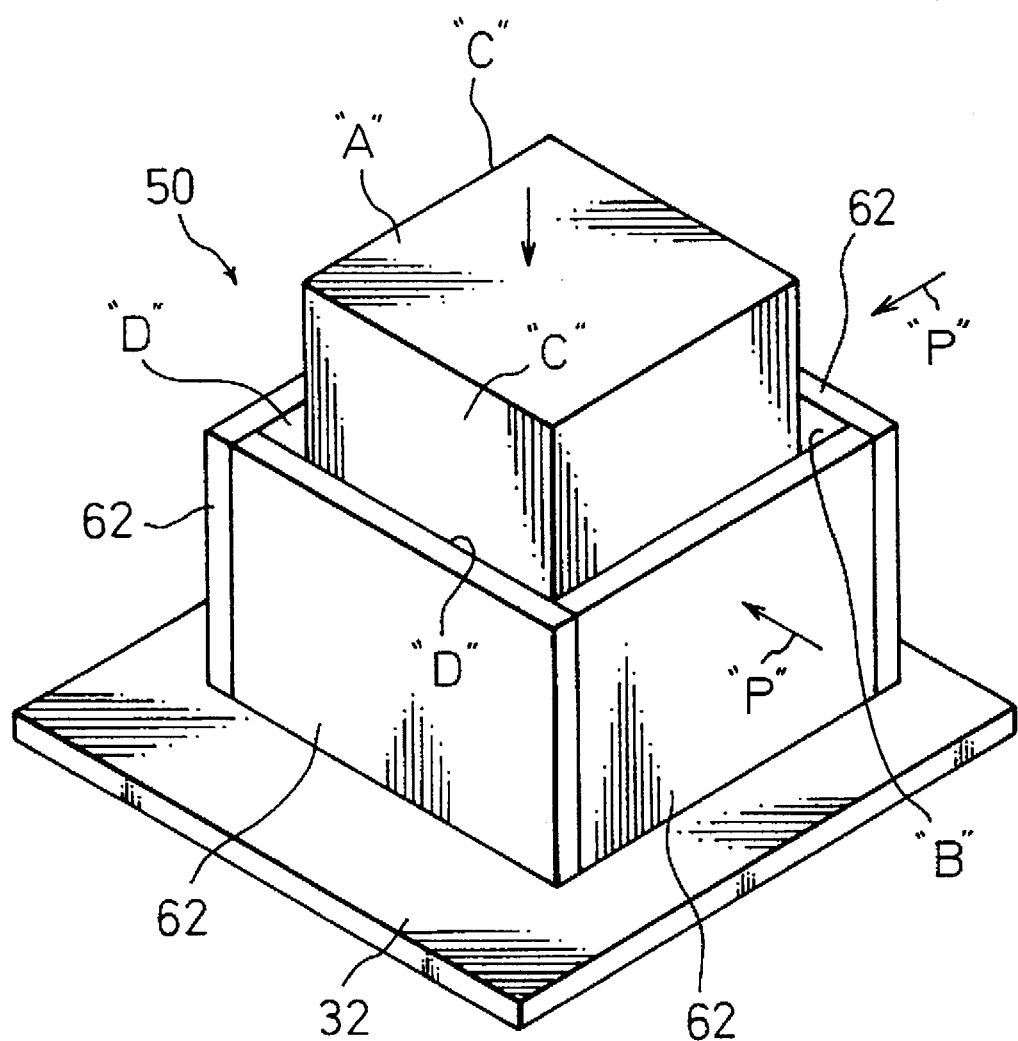

POSITIONING DEVICE FOR AN INDUSTRIAL ROBOT

TECHNICAL FIELD

The present invention relates to a positioning device for positioning an industrial articulated robot at an origin position, and to a method of positioning a multi-articulate industrial robot at an origin position by using the above-mentioned positioning device.

PRIOR ART

In an industrial robot constituted by a robot unit, and a robot controller, a plurality of movable robot elements accommodated in the robot unit are positioned at reference positions corresponding to reference positions registered on the robot controller, respectively, to enable the robot unit to perform desired robot motions accurately in conformity to a predetermined program taught to the industrial robot. Accordingly, positioning work is carried out to position the movable robot elements of the robot unit at predetermined reference positions corresponding to reference positions registered on the robot controller, respectively, at the end of manufacture and assembly of the robot unit and prior to shipping of the robot unit from the factory, at the time of installing the robot unit in a job site and prior to the start of using the robot unit, and after changing the movable parts and the drive motors of the robot unit during maintenance work.

As shown in FIG. 4, in one of the most typical prior art methods for positioning movable robot elements of the robot unit of an industrial robot at reference positions, a mastering jig 16, having a plurality of reference surfaces, is positioned with positioning pins on, and fastened with bolts to, the end effector mounting end of a robot wrist 15 of the robot unit 10 of, for example, a multi-articulated type industrial robot. Further, a gage jig 18 provided with a plurality of dial gages G1 through GN at predetermined positions thereon is positioned with positioning pins on, and fastened with bolts to, a stationary base 11 of the robot unit. A revolving robot body 12, a robot upper arm 13, a robot forearm 14 and the robot wrist 15 of the robot unit are then moved to their reference positions so that the reference surfaces of the mastering gage 16 are brought into engagement with the corresponding dial gages G1 through GN and the pointers of the dial gages G1 through GN indicate predetermined reference readings, such as 0 indications, respectively, and subsequently, a reference position setting button of a robot controller, not shown, is pushed by an operator for matching the reference positions of the movable robot elements of the robot unit with the reference positions registered in the robot controller.

As shown in FIG. 5, in another typical prior art method of positioning the movable robot elements of an industrial robot at reference positions, a jig base 26 provided with a female jig 27 having a conical hole is attached to a stationary part of a robot unit 20 including a fixed base 21, a robot body 22, a robot upper arm 23, a robot forearm 24 and a robot wrist 25, and a mastering jig 28 provided with a male jig 29 having a conical projection complementary to the conical hole of the female jig 27 is attached to the robot wrist 25. The robot unit 20 is operated to place the robot unit 20 at an origin position with the male jig 29 of the mastering jig 28 in exact engagement with the female jig 27 held on the jig base 26, and then the reference positions of the movable robot elements of the robot unit 20 match the reference positions registered on a robot controller, not shown.

The former prior art method, however, requires minute operations of the movable robot elements including the robot arm and the robot wrist to bring the reference surfaces of the mastering jig 16 into engagement with the dial gages G1 to GN, the number of which is equal to the number of the robot joints, so that the pointers of the dial gages G1 to GN give the predetermined readings on the dial gages G1 to GN, which is considerably troublesome.

The latter prior art method requires that the movable robot elements are driven by drive sources for driving the movable robot elements to move the male jig 29 to a position close to the female jig 27 held on the jig base 26, that the brake means associated with the joints is turned off, and that the movable robot elements are manually moved to bring the male jig 29 into exact engagement with the female jig 27.

Nevertheless, when each movable robot element is heavy, it is difficult for the operator to move the movable robot element by hand even if the associated brake means is turned off and hence it is difficult to maintain the male jig and the female jig in close contact with each other.

Furthermore, when the industrial robot is a six-axis multi-articulated type robot and the robot wrist 25 has three degrees of freedom of motion, the male jig 27 is able to turn about its axis relative to the female jig 29 and, consequently, the final origin position cannot be determined. Hence this prior art method is not applicable to six-axis multi-articulated type industrial robots.

DISCLOSURE OF THE INVENTION

Accordingly, a principal object of the present invention is to provide a positioning device superior in operability to conventional positioning devices, and applicable to positioning the movable robot elements of the most generally used six-axis multi-articulated type industrial robots at their reference positions.

Another object of the present invention is to provide a positioning device, for an industrial multi-articulated type robot, which has a simple construction and is hence capable of being easily fabricated.

In view of the disadvantage of the combination of the male jig having a conical projection and the female jig having a conical hole complementary to the conical projection, the present invention provides an arrangement of a polygonal male jig having a polygonal protrusion having flat surfaces, and a polygonal female jig having a polygonal recess for receiving the polygonal protrusion therein, and the movable robot elements of a multi-articulated type industrial robot are positioned at respective reference positions by exactly engaging the polygonal male jig and the polygonal female jig. The present invention also provides a pressing means for bringing predetermined flat surfaces among the flat surfaces of the polygonal male jig gradually into close contact with predetermined flat surface among the flat surfaces of the polygonal female jig when engaging the polygonal male jig and the polygonal female jigs with their corresponding flat surfaces in close contact with each other so as to permit an operator to establish the original position of the robot unit of the multi-articulated type industrial robot with a high accuracy.

In accordance with the present invention, there is provided a positioning device for setting an origin position of a multi-articulated type industrial robot, including a pair of positioning jigs capable of being attached to an extremity of a robot wrist and a stationary part of the robot unit, respectively, of the multi-articulated type industrial robot, characterized in that, the pair of positioning jigs of the positioning device comprises:

a polygonal male jig detachably attached to the robot wrist;

a polygonal female jig detachably attached to the stationary part of the robot unit, the polygonal female jig being provided with a polygonal recess for receiving the polygonal male jig therein, the polygonal female jig further having three inner flat faces able to confront at least three outer flat faces provided on the polygonal male jig; and, a pressing unit arranged on the female jig for pressing the outer flat surfaces of the male jig in close contact with the inner flat surfaces of the polygonal recess of the female jig.

Preferably, the polygonal male jig has a cubic block, and a suitable bracket for holding the cubic block, and is capable of being positioned with positioning pins on, and being fastened with screw bolts to, the end effector mounting end of the robot wrist of the robot unit, and the polygonal female jig is capable of being attached to a stationary part such as a robot base, and is formed in the shape of a bottomed box having an open upper end, and has a bottomed cubic recess able to receive the cubic block therein, the bottomed cubic recess being defined by a bottom wall and four side walls.

Although it is preferable, in view of the simplicity of construction, that the pressing unit comprises a suitable number of screw bolts threadedly engaged in threaded holes formed in the side walls of the polygonal female jig or in brackets attached to the side walls of the polygonal female jig, air cylinder actuator units of an appropriate size or pneumatically operated plunger units may be employed instead of the screw bolts, and the pneumatic cylinder actuator unit or the pneumatically operated plunger unit may be mounted on the side walls and may be operated for pneumatically pressing.

When the positioning device of the present invention thus constituted is employed, the movable robot elements of the robot unit of an articulated industrial robot including a revolving robot body, a robot upper arm, a robot forearm and a robot wrist are driven for movement by drive sources to permit the polygonal male jig attached to an extremity of the robot wrist to be received in the polygonal female jig, and then the pressing unit, i.e., the screw bolts or the pneumatic cylinder actuators, are operated to press the polygonal male jig gradually from outside to bring at least three predetermined flat surfaces among the outer surfaces of the cubic block of the polygonal male jig into contact with the corresponding three flat inner surfaces of the polygonal female jig, respectively. When the three outer flat surfaces of the polygonal male jig are brought into close contact with the corresponding three inner flat surfaces of the polygonal female jig, the positioning of the robot unit at the origin position is completed.

Then, a reference position setting unit, such as a reference position setting push-button switch disposed on the operating panel of a robot controller, not shown, or on a pendant type switch unit is operated to obtain a matching of the reference positions of the movable robot elements of the robot unit with the reference positions registered on the robot controller.

Since, in the present invention, the robot unit is positioned at the original position by bringing the polygonal jigs into exact engagement, it is possible to achieve positioning of the movable robot elements of an industrial robot exactly at their reference positions even if the industrial robot is a six-axis multi-articulated type industrial robot provided with a robot wrist having three degrees of freedom of motion, to which the prior art method using conical jigs could not have been applied. Since the flat surface of the polygonal male jig are made in close contact with the corresponding flat surfaces of the polygonal female jig by operating the pressing means, i.e., the screw bolts, after turning off the braking means associated with the movable robot elements, the operator is able to easily move the movable robot elements by means of the pressing means even if the movable robot elements are heavy.

BRIEF DESCRIPTION OF THE DRAWINGS

The above and other objects, features and advantages of the present invention will become more apparent from the ensuing description taken in conjunction with the accompanying drawings, wherein:

FIG. 2 is an enlarged, fragmentary, partly sectional side view of an essential portion of the positioning device of FIG. 1 and the associated parts of the six-axis multi-articulated type industrial robot;

FIG. 3 is a schematic perspective view of a positioning device in a preferred embodiment according to the present invention, for assistance in explaining the principle of the present invention;

BEST MODE OF CARRYING OUT THE INVENTION

Figure 1:
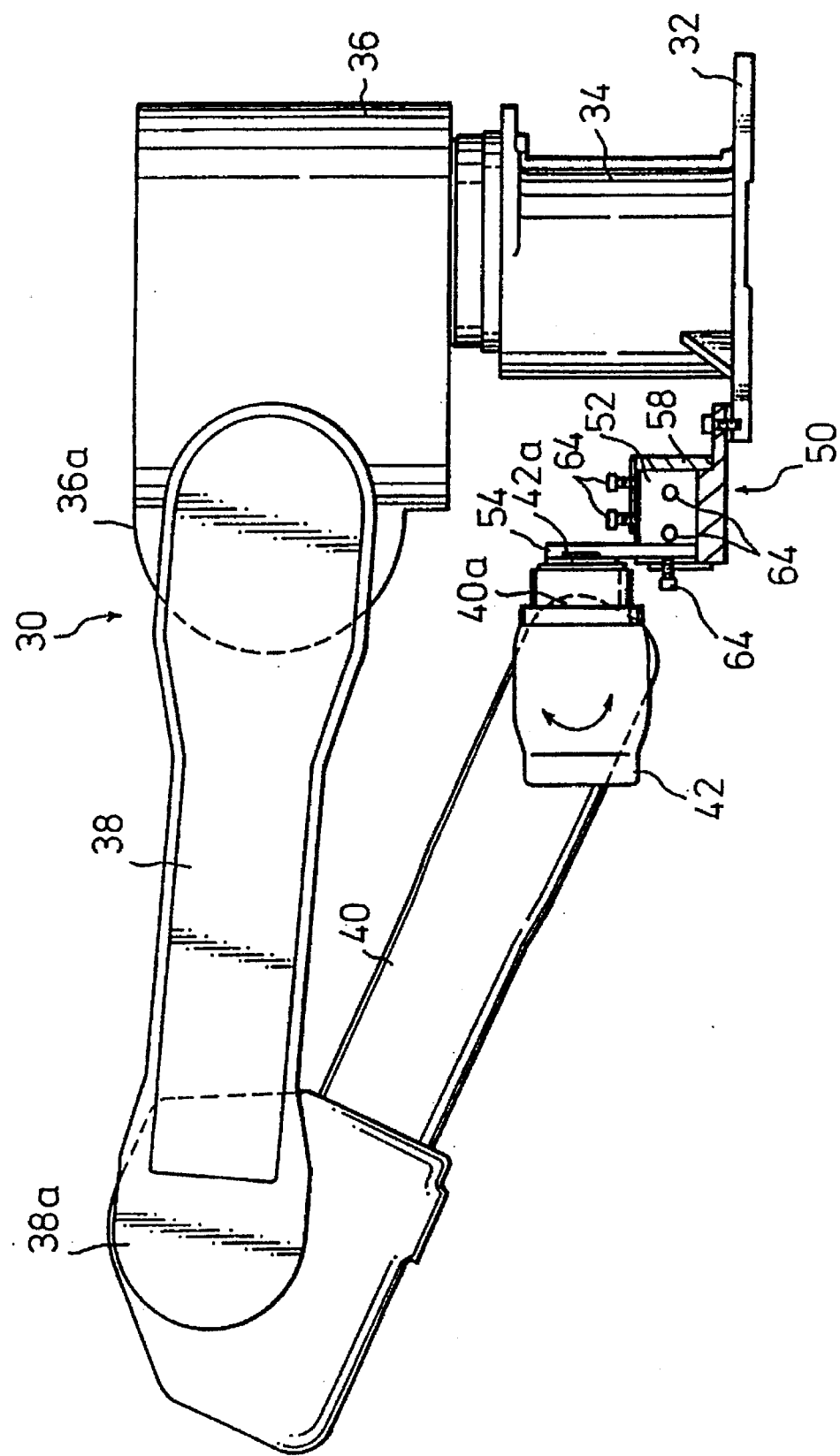
FIG. 1 is a side view, partially in section, of a six-axis articulated industrial robot provided with a positioning device, in accordance with the present invention, for positioning the movable robot elements of the six-axis multi-articulated type industrial robot at their reference positions.

Referring to FIG. 1, a robot unit 30 for a six-axis multi-articulated type industrial robot is provided with a positioning device in accordance with the present invention, a base 32, a stationary robot body 34 set on the base 32, a revolving robot body 36 mounted for turning relative to the stationary robot body 34 about a vertical axis on the stationary robot body 34, a robot upper arm 38 pivotally joined for turning about a horizontal axis to a laterally projecting end 36a of the revolving robot body 36, a robot forearm 40 pivotally joined for turning about a horizontal axis to the extremity 38a of the robot upper arm and capable of rotating about the longitudinal axis thereof, and a robot wrist 42 pivotally joined for turning about a horizontal axis to the extremity 40a of the robot forearm 40.

A mounting part, on which an end effector such as a robot hand (not shown) is mounted, is formed in the extremity 42a of the robot wrist 42.

A positioning device 50 embodying the present invention includes a polygonal male jig 52 to be positioned with positioning pins (not shown) on, and fastened with screw bolts (not shown) to, a bracket 54 attached to the extremity 42a of the robot wrist, i.e., one of the movable robot elements of the robot unit 30, and a polygonal female jig 58 positioned with positioning pins (not shown) at a predetermined position on and fastened with bolts to a fixed stationary part such as the base 32 of the stationary robot body 34.

In FIG. 1, the robot unit 30 is exactly set at an origin position by the positioning device 50, in which the polygonal male jig 52 and the polygonal female jig 58 are exactly mated with each other.

The positioning device 50 shown in FIG. 1 is provided with a plurality of screw bolts 64 (only three of the screw bolts 64 can be seen in FIG. 1) as pressing means, namely, auxiliary means, for pressing the polygonal male jig 52 into close contact with the polygonal female jig 58.

Referring now to FIG. 2 showing the positioning device 50 in an enlarged view, the polygonal female jig 58 is formed by attaching a plurality of side members 62 to a jig base 60. Preferably, the polygonal female jig 58 is formed as a structure having a bottomed cubic hole 65 substantially similar to the polygonal male jig 52 and capable of receiving the polygonal male jig 52 with clearances between the outer surfaces of the polygonal male jig 52 and the corresponding inner surfaces of the polygonal female jig 58.

The screw bolts 64 serving as the pressing means are screwed in threaded holes formed in the side members 62. When the bolts 64 are screwed in, the tips of the bolts 64 come into contact with the side surfaces and the top surface of the polygonal male jig 52 having a cubic shape, and, as the bolts 64 are screwed further in, the polygonal male jig 52 is pushed gradually toward a predetermined position in the cubic hole 65 for positioning. The tips of the screw bolts 64 serve as pushing ends exposed in the cubic hole 65.

In the described embodiment, the polygonal male jig 52 is pressed against the jig base 60 with the two screw bolts 64 screwed in threaded holes formed in a top plate 66 capable of being fixedly attached to the upper ends of the side members 62 of the polygonal female jig 58 to permit removal for the insertion of jig 52 and to hold the polygonal male jig 52 immovable in the cubic hole 65 so that the polygonal male jig 52 is not allowed to move or play in the cubic hole 65 due to an unbalancing weight.

Referring to FIG. 3 showing the basic construction of the positioning device 50, a cubic body A serving as the polygonal male jig 52 is received in a bottomed hole B having an open upper end and serving as the cubic hole 65. As mentioned above, the side members 62 are set upright on the jig base 32. When the cubic body A is held immovable within the cubic hole B with the two flat side surfaces C and the flat bottom surface among the six flat outer surfaces of the cubic body A in close contact with the two flat side surfaces D among the four flat inner surfaces of the side members 62, and the bottom surface of the bottomed cubic hole B, namely, the upper surface of the jig base 32, respectively, the robot unit 30 is set uniquely in the origin position.

Figure 3A:
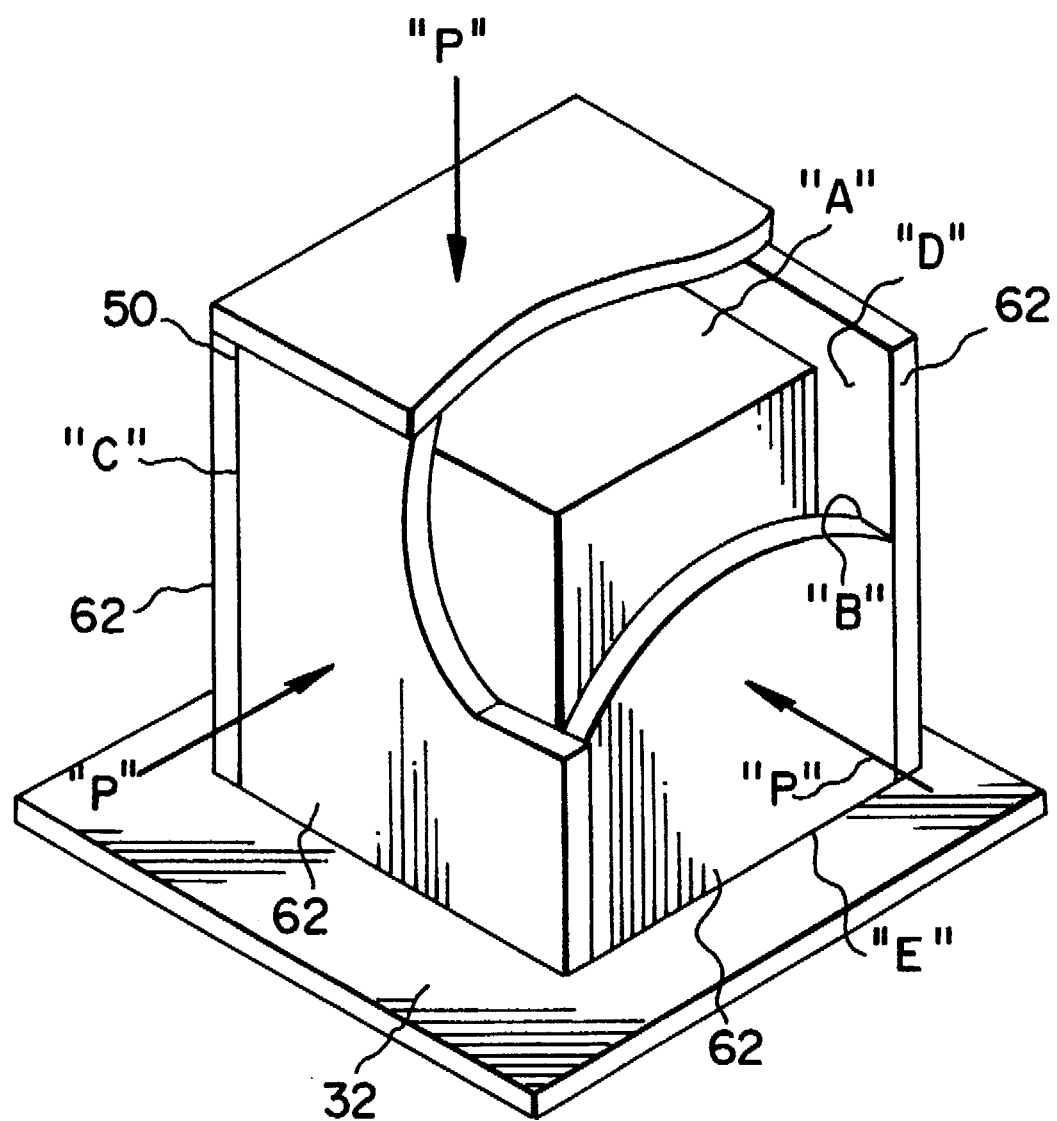
FIG. 3A is the same view as FIG. 3 and shows additional structure.
Figure 4:
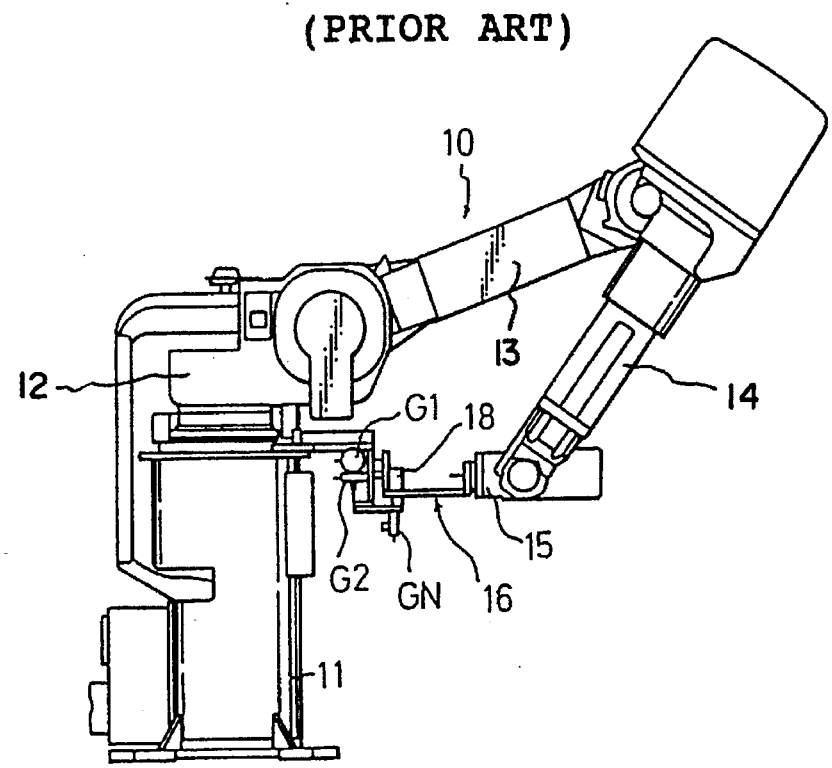
FIG. 4 is a side view of an industrial robot, for assistance in explaining a typical prior art method of positioning the movable robot elements of the industrial robot at their reference positions; and, FIG. 5 is a side view of the robot unit of an industrial robot, for assistance in explaining another typical prior art method of positioning the movable robot elements of the industrial robot at their reference positions.
Figure 5:
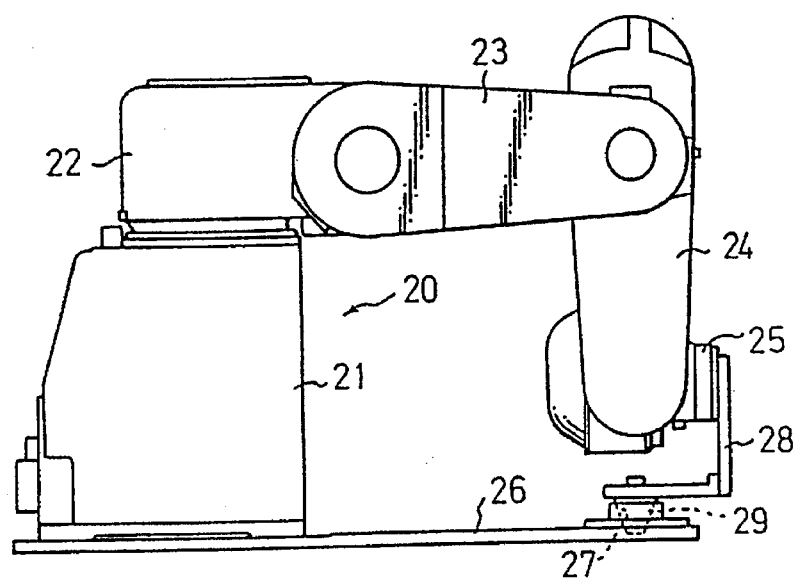

In FIG. 3 and 3A, the arrows indicate the pressing actions of the bolts 64, i.e., the pressing means (not shown in this figure). It is to be noted that in FIG. 3A, for convenience, the adjusting pressure is imposed by means of screw bolts (numbered 64 in FIGS. 1 and 2 but which are not shown in this figure for clarity sake) through the top plate, the front plate and the left side plate. The positioning function of the positioning device 50 in accordance with the present invention will be describes with reference to FIGS. 1 and 2.

Referring to FIG. 3A, the male jig 52 is brought into contact with the rear, side and bottom faces of the female jig 58 by tightening the adjusting screws 64 through the front, side and top faces, and thereby applying pressure "P" to the male jig 52 and moving it into close contact with the fixed walls of the female jig. Thus, when complete contact between the male jig 52 and the three inner walls of the female jig is established, the mechanical positioning of the robot is completed.

When positioning the robot unit 30 in the original position, first the movable robot elements, i.e., the revolving robot body 36, the robot upper arm 38, the robot forearm 40 and the robot wrist 42 are driven for movement to move the polygonal male jig 52 into the cubic hole 65 of the polygonal female jig 58. Since this positioning work for placing the polygonal male jig 52 into the cubic hole 65 is carried out by driving the movable robot elements by the associated drive motors, not shown, the positioning work can be achieved without imposing any burden on an operator even if the robot unit 30 is large. Generally, the positioning work can be readily carried out by operating a pendant type controller to turn or revolve the movable robot elements sequentially on the joints.

After the polygonal male jig 52 has been received in the cubic hole 65 of the polygonal female jig 58, the brake means, not shown, are turned off to remove the braking function acting on the joints of the movable robot elements.

Then, the pressing means 64 are operated with a tool, such as a screw driver or the like, to bring the tips of the bolts 64 into contact with the polygonal male jig 52 and to drive the polygonal male jig 52 for gradual movement to the aforesaid position where the flat surfaces C are in close contact with the corresponding flat surfaces D as explained with reference to FIG. 3. Thus, the positioning of the robot unit 30 in the geometrical origin position is completed when the corresponding flat surfaces of the polygonal male jig 52 and the polygonal female jig 58 are brought into close contact with each other. Then, the reference position setting button of the operating panel, not shown, is operated to match the reference positions with the reference positions registered on the robot controller.

The positioning device of the present embodiment includes the polygonal male jig 52 formed in a cubic body and the polygonal female jig 58 provided with a corresponding cubic hole, because the basic disadvantage of the prior art positioning device comprising the male jig formed as a conical block and the female jig provided with a conical hole that the male jig is able to turn relative to the female jig when the movable robot elements of the robot unit of the six-axis multi-articulated type industrial robot are moved to set the robot unit in the original position and, consequently, it is impossible to set the robot unit in the origin position, and because the flat surfaces, i.e., the predetermined flat surfaces C and D, to be brought into close contact with each other can be easily finished to a high accuracy and the adjacent flat surfaces can be easily formed to be parallel. However, as required, the positioning device may be, for example, a combination of a pentagonal male jig formed in a pentagonal prism and a pentagonal female jig provided with a pentagonal hole or recess similar to the pentagonal prism or a combination of a triangular male jig formed in a triangular prism and a triangular female jig provided with a triangular hole or recess similar to the pentagonal prism for the same purposes. The screw bolts serving as the pressing means or unit are the simplest mechanical means, and it may be readily understood by persons with ordinary skill in the art that, for example, the pressing means may be conventional air cylinder actuators and the air cylinder actuators may be mounted on the side members of the female jig to position the male jig by pressing it in the same way as the aforementioned screw bolts.

As is apparent from the foregoing description, according to the present invention, the robot unit can be positioned at the original position by bringing the flat surfaces of the polygonal male jig into close contact with the corresponding flat surfaces of the polygonal female jig, and the polygonal male jig can be driven for gradual movement by operating the pressing means by hand in bringing the flat surfaces of the polygonal male jig into close contact with the corresponding flat surfaces of the polygonal female jig. Thus, the positioning work of the operation for positioning the robot unit in the original position is facilitated and the robot unit can be positioned with a high accuracy.

Furthermore, the present invention is not limited in its application by the degree of freedom of motion about the joints of the multi-articulated type industrial robot, and the improved functions of the present invention are applicable to positioning the robot unit at the origin position without entailing any problem.

Still further, since the robot unit can be readily set in the geometrical origin position by the operation of the pressing means by an operator, the present invention is applicable to positioning the robot unit of a comparatively large and comparatively heavy industrial robot.

We claim:

1. A positioning device for setting an origin position of a multi-articulated industrial robot comprising a pair of positioning jigs capable of being attached to an extremity of a robot wrist and a stationary part, respectively, of a robot unit of a multi-articulated industrial robot, wherein, said pair of positioning jigs of the positioning device comprise respectively, a polygonal male jig detachably attachable to said robot wrist;

a polygonal female jig detachably attachable to said stationary part of said robot unit, said polygonal female jig further having at least, three inner flat surfaces able to confront at least three corresponding outer flat surfaces provided on said polygonal male jig; and, pressing means arranged on said female jig for pressing the outer flat surfaces of said male jig into close contact with said inner flat surfaces of said polygonal recess of said female jig.

2. A positioning device for a multi-articulated type industrial robot according to claim 1, wherein said polygonal male jig comprises a cubic body and a bracket means for holding said cubic body which is detachably mountable onto an effector formed at an extremity of said robot wrist, and wherein said polygonal female jig comprises a bottomed box structure having an open upper end, with a cubic recess for receiving said cubic body therein, said cubic recess being defined by four side surfaces and a bottom surface, and is capable of being detachably fastened to said stationary part of said robot unit.

3. A positioning device for a multi-articulated type industrial robot according to claim 2, wherein said pressing means comprises a plurality of screw bolts mounted on a multiplicity of said side surfaces of said bottomed box structure so that the tips thereof project into an interior of said bottomed box structure, and against said cubic body by rotating said screw bolts to move said cubic body.

* * * * *